United States Patent [19]

Mizrah et al.

[11] Patent Number: 4,732,594
[45] Date of Patent: Mar. 22, 1988

[54] PROCESS FOR SCRUBBING EXHAUST GASES FROM DIESEL ENGINES AND FILTER CARTRIDGE FOR CARRYING OUT THE PROCESS

[75] Inventors: Tiberiu Mizrah, Schaffhausen, Fed. Rep. of Germany; Konrad Kampfer, Thayngen; Wolfhart Rieger, Buch, both of Switzerland

[73] Assignee: Swiss Aluminium Ltd., Chippis, Switzerland

[21] Appl. No.: 893,594

[22] Filed: Aug. 6, 1986

[30] Foreign Application Priority Data

Aug. 16, 1985 [CH] Switzerland ............... 3535/85

[51] Int. Cl.$^4$ ............................................. B01D 39/06
[52] U.S. Cl. .................................. 55/523; 55/DIG. 30; 55/524; 60/311; 501/81
[58] Field of Search ............... 55/486, 487, 522, 523, 55/498; 60/311; 501/81

[56] References Cited

U.S. PATENT DOCUMENTS

| | | | |
|---|---|---|---|
| 3,907,579 | 9/1975 | Ravault | 501/82 |
| 4,205,971 | 6/1980 | Abthoff et al. | 55/DIG. 30 |
| 4,264,346 | 4/1981 | Mann | 55/DIG. 30 |
| 4,451,441 | 5/1984 | Ernest et al. | 55/487 |
| 4,631,077 | 12/1986 | Spicer et al. | 55/487 |

FOREIGN PATENT DOCUMENTS

| | | | |
|---|---|---|---|
| 184422 | 11/1982 | Japan | 55/523 |
| 139718 | 8/1983 | Japan | 55/523 |

Primary Examiner—Bernard Nozick
Attorney, Agent, or Firm—Bachman & LaPointe

[57] ABSTRACT

A process for scrubbing exhaust gases from diesel engines using filter cartridges of open pore ceramic foam are such that the filter cartridges are situated in the exhaust gas stream such that the exhaust gases strike the filter cartridge end and flow through it parallel to its central axis. As a result the amount of soot deposited is greatest in the part of the cartridge first meeting the inflowing exhaust gases, and decreases rapidly with increasing throughput; consequently the low efficiency part contributes greatly to the undesired backpressure. The proposed process, in which the exhaust gases flow through the most efficient part of the filter cartridge made of open pore ceramic foam, is such that the exhaust gases flow essentially transverse to the longitudinal axis and thus does not exhibit these disadvantages. The filter cartridge comprise an open pore ceramic foam for carrying out the process of the invention and comprises a cylinder with cylindrical shaped opening the central axis of which coincides with that of the cylinder. The opening can be closed at one end.

7 Claims, 5 Drawing Figures

PROCESS FOR SCRUBBING EXHAUST GASES FROM DIESEL ENGINES AND FILTER CARTRIDGE FOR CARRYING OUT THE PROCESS

BACKGROUND OF THE INVENTION

The present invention relates to a process for scrubbing exhaust gases from diesel engines using filter cartridges of open pore ceramic foam, and relates too to a filter cartridge for carrying out the process.

The soot content of waste gases emitted by diesel engines can, basically, be reduced in two ways viz., by optimising the preparation of the mixture and the combustion sequence in the engine, and by inserting filters in the path of the exhaust gas stream. Depending on the design of the filter, the amount of soot extracted is usually 50–90%.

The active filter volume, however, cannot be freely changed in order to achieve optimum extraction of soot, because the filter constitutes a resistance that creates a back-pressure acting on the exhaust gas. This back-pressure must not be too high, otherwise the power output of the engine will be reduced and the fuel consumption increased. In the case of diesel engines in private cars fitted with exhaust gas filters, the back pressure should at most be 0.2 bar.

As the exhaust gas filter would quickly become blocked with soot, the latter must be burnt off from time to time. The interval from one regeneration phase to the next regeneration phase is designated the regeneration interval. Under certain driving conditions the filter regenerates itself automatically. The soot deposit is then combusted at temperatures of 550°–700° C., if the filter features a catalyt coating, the combustion temperature can be lowered to about 400° C.

Irregular regeneration can lead to uncontrolled combustion causing much higher peak temperatures due to accumulation of heat. Because the high peak temperatures that occur during the combustion of the soot are followed by cooling to the exhaust gas temperature, it is necessary to employ filter materials that are capable of withstanding high temperatures and thermal shock.

From the U.S. Pat. No. 4,264,346 it is known, for the above mentioned purpose, to employ an open pore ceramic foam of cordierite in the form of a solid cylinder. By an open pore ceramic foam is to be understood here a porous ceramic body with a three dimensional network and cellular structure containing a plurality of continuous, interconnecting hollow spaces. The ceramic body is situated in the path of the exhaust gas stream of the diesel engine in such a manner that the exhaust gases strike the ceramic body end-on and flow through it parallel to its central axis. The deposit of soot is greatest in that part of the filter through which the gases flow first and decreases rapidly with increasing passage of exhaust gas. As a result the part of the filter with which the gases have first contact reaches its soot capture capacity after a relatively short time and has to be regenerated; the rest of the filter is still capable of capturing soot but is then likewise subjected to the regeneration process earlier that in fact is necessary.

Although cordierite ceramic is particularly resistant to temperature changes, the handling of a filter of the kind described above leads relatively quickly to mechanical damage of the filter because of the relatively frequent regeneration required. A further disadvantage of such a filter is that filtration is not uniformly efficient over the whole length, and the less efficient part of the ceramic filter contributes substantially to the back pressure mentioned at the start.

The object of the present invention is to eliminate at least in part the above mentioned disadvantages encountered in the scrubbing of diesel engine exhaust gases using filters of open pore ceramic foam.

SUMMARY OF THE INVENTION

The foregoing object is achieved by way of the invention wherein the exhaust gases flow through the effective part of the filter cartridge essentially transverse to the longitudinal axis of the filter.

A filter cartridge of open pore ceramic foam for carrying out the process according to the invention is such that it is in the form of a cylinder and features a cylindrical shaped opening the axis of which is coincident with the axis of the cylinder.

A further filter cartridge according to the invention made of open pore ceramic foam and for carrying out the process according to the invention is such that it is in the form of a hollow cylinder closed at one end and comprising cylinder, base and cylindrical opening, the axis of which coincides with the axis of the cylinder.

The process according to the invention has the result that the cross-sectional area of filter across which the exhaust gas has to flow is increased over that in a filter in which the gas flows parallel to the central axis of the filter. For a given flow of exhaust gas this leads to a reduction in the back pressure.

The open pore ceramic foam of a filter cartridge according to the invention occupies a larger volume than a conventional filter of open pore foam structure with the same porosity in which the exhaust gases flow parallel to the central axis with the same back pressure. Consequently a filter cartridge according to the invention has the advantage of a larger soot capture capacity, which results in longer intervals between regeneration treatments.

Further advantages and details of the invention are revealed by way of the drawing and the following exemplified embodiments.

DETAILED DESCRIPTION

Figure 1:
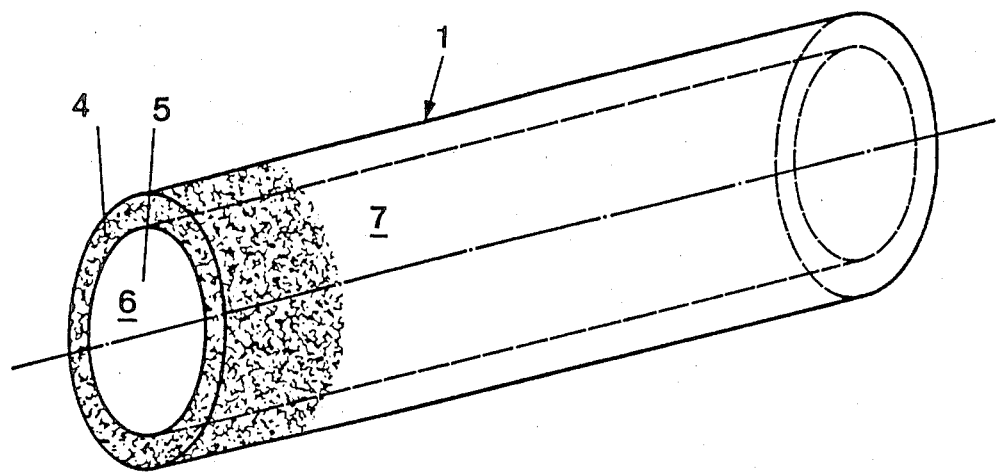
FIGS. 1 and 2 are perspective views of a filter cartridge.

FIG. 1 shows a filter cartridge 1 of open pore ceramic foam in the form of a cylinder 4 penetrated fully by a cylindrical shaped opening 5. The structure of the surface is indicated on only part of the cartridge 1. The central axis of the opening 5 coincides with the central axis of the cylinder 4.

Figure 2:
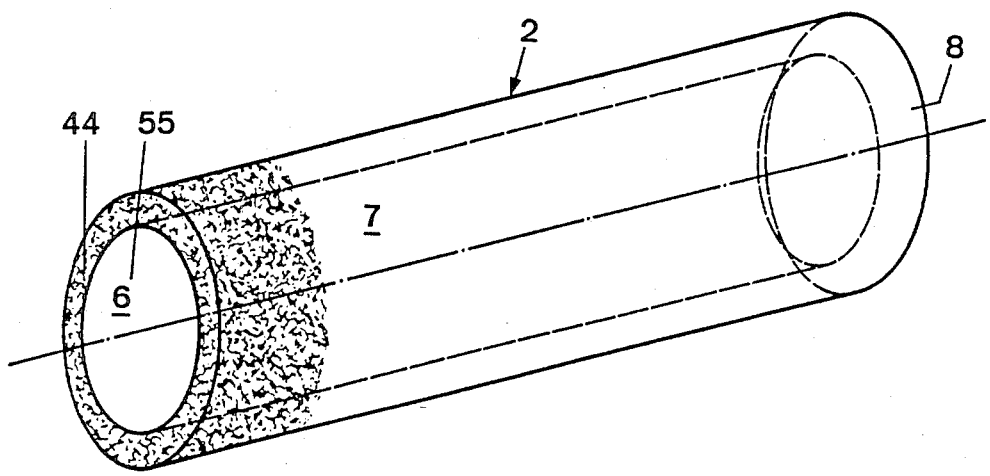

FIG. 2 shows a filter cartridge 2 of open pore ceramic foam in the form of a cylinder 44 with cylindrical shaped opening 55, the central axis of which likewise coincides with that of the cylinder 44. The structure of the surface is indicated only over part of the cartridge 2. The opening 55, however, does not pass completely through the cylinder 44, but is closed off at one end by a base 8 in the cylinder 44 or of a dense material which is practically impermeable by the exhaust gases. There is no relationship between the base 8 and the thickness of the cylinder 44. It is useful, however, in the case that the base 8 is also of open pore ceramic foam, to choose the thickness of the base 8 such that it is the same as the thickness of the wall of the cylinder 44.

Figure 3:
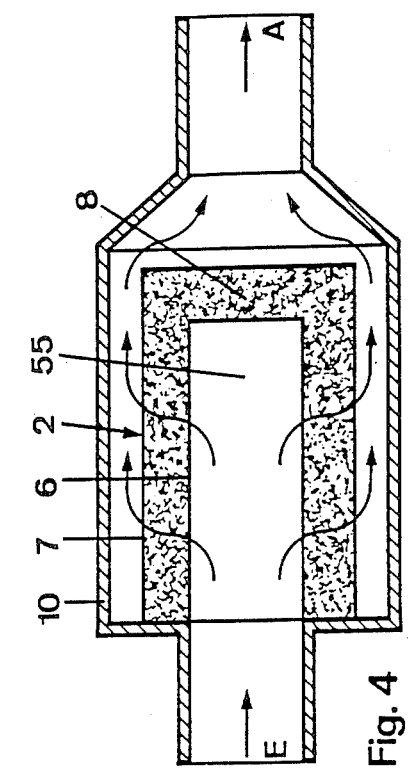
FIGS. 3 and 4 are views in cross-section of the filter cartridge of FIGS. 1 and 2 in an exhaust gas scrubbing facility.
Figure 4:
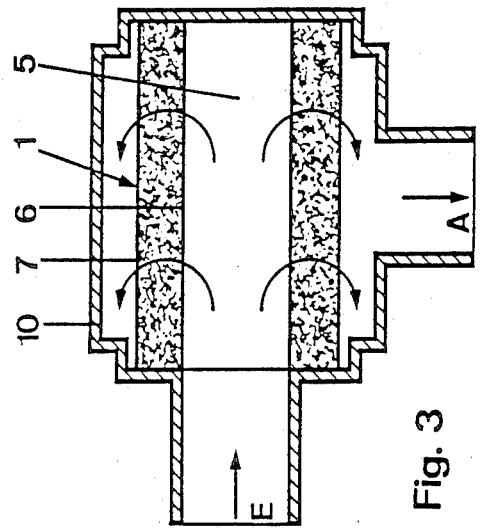

FIGS. 3 and 4 show by way of example how the filter cartridges 1 and 2 resp. can be inserted in a device 10 for scrubbing diesel engine exhaust gases. The path taken by the gases is indicated by arrows. The exhaust gases coming from the diesel engine enter the device 10 via inlet E then opening 5 or 55 and flow through the filter cartridge 1 or 2 more or less via the shortest route i.e. transverse to the longitudinal axis, from the inner face 6 to the outer face 7 and if necessary—depending on the type of base 8, whether permeable or not—to a small extent through the base 8 of filter cartridge 2. As such, the whole of the cross section of the filter cartridge through which the exhaust gases flow is uniformly effective as a filter. The purified gases leave the device 10 via exit A.

Figure 5:
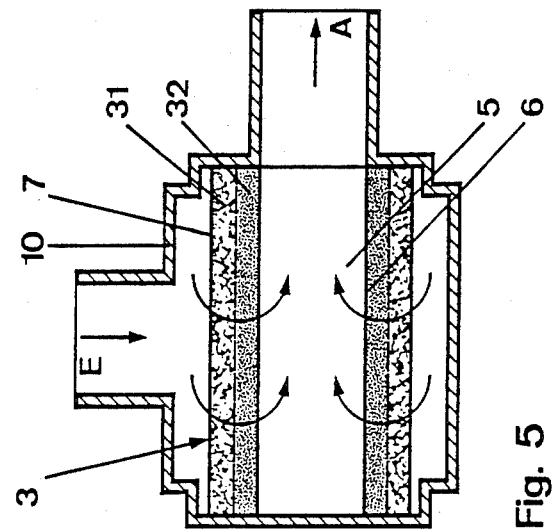
FIG. 5 is a cross-sectional view of another filter cartridge in an exhaust gas scrubbing facility.

FIG. 5 represent an arrangement similar to that shown in FIG. 3. The contaminated exhaust gases from the engine however encounter, via inlet E of waste gas scrubber 10, first surface 7 of filter cartridge 3 which is in the form of a cylinder 4 with cylindrical opening 5 the axis of which coincides with the axis of the cylinder 4; the exhaust gases flow through the filter cartridge 3 in the direction of the inner face 6, enter opening 5 and leave the device 10 via exit A. The filter cartridge 3 comprises two cylindrical, intimately-joined open-pore ceramic foam layers 31, 32 the central axes of which coincide with the longitudinal axis of the filter cartridge 3. The layer 31 forming the outer mantel exhibits a porosity, for example, of 50 pores per inch (in the following denoted as ppi as is the customary terminology), the inner layer facing the opening 5 features a porosity for example of 70 ppi. In contrast to conventional filters of open pore ceramic foam with uniform porosity over the whole cross section and the same degree of soot precipitation, lower back pressures are achieved with such a filter cartridge 3 in which the number of pores per inch increases in the direction of gas flow through the porous ceramic, this provided the contaminated exhaust gases first encounter such a multi-layer filter on the side with the ceramic foam layer of coarser porosity.

To manufacture the filter cartridge according to the invention with uniform porosity, an open pore plastic foam with the geometric form of the desired ceramic filter cartridge, and taking into account the known shrinkage that occurs when calcining ceramic masses, is saturated with a slurry viz., an aqueous suspension of a ceramic powder of grain size less than 100 μm and average grain size of about 7 μm. After drying the impregnated foam, for example at 100° C. for 24 hours, this green strength body is heated and so baked in a, preferably electrically heated, furnace up to the sintering temperature of the ceramic. Already at a temperature of 300° C. the foam burns off and leaves behind an open pore ceramic foam that features a three dimensional network with a cellular structure containing a plurality of continuous, interconnected hollow spaces. The time for heating to a sintering temperature of about 1200°–1360° C. is about 24 hours. The time required for holding at the sintering temperature is 2–10 hours, preferably 6 hours. The baked open pore ceramic foam body is the filter cartridge, ready for use. This can if desired be coated with a substance which acts catalytically.

It has now been found that open pore ceramic foam which is particularly insensitive to thermal shock can be prepared for the filter cartridge according to the invention using a ceramic powder made up of 68–95 wt % Petalite
1–5 wt % Bentonite
1–5 wt % Kaolin and
0–30 wt % Alumina.

Characterised by way of, particularly low sensitivity to thermal shock and high resistance to mechanical abrasion is a mixture of 79 wt % Petalite
3 wt % Bentonite
3 wt % Kaolin and
15 wt % Alumina The raw materials are characterised by their analytical composition as follows:

Petalite: 4 wt % Li$_2$O, 16 wt % Al$_2$O$_3$, 78 wt % SiO$_2$, the remainder inpurities (Fe, Ca, Mg, Na, K);

Kaolin: 48 wt % SiO$_2$, 37 wt % Al$_2$O$_3$, 33.1 wt % loss on ignition, remainder impurities (Fe, Ti, Ca, Mg, K, Na);

Bentonite: 67 wt % SiO$_2$, 17 wt % Al$_2$O$_3$, 2 wt % Fe$_2$O$_3$, 1 wt % CaO, 3 wt % MgO, 4 wt % Na$_2$O, 6 wt % loss on ignition;

Alumina (Corundum): 99.8 wt % Al$_2$O$_3$.

To manufacture the slurry, the raw materials were ground down to the previously mentioned grain size in a ball mill along with water in a ratio of 3:1 and an addition of Darvan No. 7 as thinning agent; by further addition of water which, if desired, can contain an additive to increase the green strength of the unbaked filter body e.g. Tylose, a slurry can be produced with a viscosity such that it completely wets plastic foam when impregnating the latter.

EXAMPLE NO. 1

A polyurethane foam, with 35 ppi, three dimensional network and cellular structure with continuous, intersecting spaces, in the form of a cylinder with penetrating opening was impregnated with a slurry containing as solids 68 wt % petalite, 25 wt % alumina, 3 wt % bentonite and 4 wt % kaolin and sintered for 6 hours in a temperature range of 1340° C.±15° C. The sintered body comprised an open pore ceramic foam with 40 ppi and represents the filter cartridge according to the invention shown in FIG. 1. The thermal coefficient of expansion of the ceramic foam was $2 \times 10^{-6}$/°C. A particular advantage of the above composition of solid constituents in the slurry is the high mechanical strength of the ceramic foam produced with it, and the large interval of sintering temperature it permits in manufacture of the ceramic body.

By means of x-ray studies it was found that the sintered ceramic foam is comprised essentially of lithium-aluminium silicate (ASTM index 15-27) and contains to a lesser extent corundum and mullite. From microscope studies it is known to feature a small fraction of a glass phase. The higher mechanical strength is attributed to the mullite. The low sensitivity to sintering which is expressed in the form of the large interval of sintering temperatures, could be due to the fraction of glass phase.

EXAMPLE NO. 2

In a manner analogues to that in the first example a polyurethane foam with 71 ppi, and in the shape of a hollow cylinder as shown in FIG. 2, was soaked with a slurry containing 95 wt % petalite, 3 wt % alumina, 1 wt % bentonite and 1 wt % kaolin as solids fraction and then dried. Subsequently, by repeated immersion of the base in the slurry the spaces in the base of the plastic foam body were filled completely with particulate solid material of the slurry. The green strength body was sinter baked for 4 hours at 1280° C. The sintered body, comprising open pore ceramic foam cylinder with 80 ppi and dense base represented the filter according to the invention. After sintering, the base exhibited only extremely low permeability to the gas phase—the residual permeability being due to the burning off of the polyurethane foam.

Due to the higher petalite content of the slurry compared with example No. 1, the open pore ceramic foam exhibited a coefficient of thermal expansion of $0.7 \times 10^{-6}/°C$., which endows the material with a high degree of stability when subjected to temperature changes. With a composition which is qualitatively the same as in example No. 1 but, as is to be expected, containing a much larger fraction of lithium aluminum silicate, the mechanical strength is somewhat lower than in example No. 1. Also the sintering temperature must be maintained more accurately, otherwise deformation of the sintered body can be observed.

EXAMPLE NO. 3

A slurry containing 79 wt % petalite, 3 wt % bentonite, 3 wt % kaolin and 15 wt % alumina as solids leads to an optimum ratio of resistance-to-temperature fluctuations to mechanical strength.

A polyurethane foam of 53 ppi in the form of an open cylinder as shown in FIG. 1, 150 mm long, 140 mm diameter and 40 mm wall thickness, was immersed in conventional manner in such a slurry, dried an then baked at 1300° C. for 6 hours.

The sintered body comprised an open pore ceramic foam of 60 ppi and is representative of the filter cartridge according to the invention.

This filter cartridge was employed for scrubbing the exhaust gases from a diesel enginge, for which purpose it was mounted in a device with the arrangement shown schematically in FIG. 3. A soot extraction efficiency of 80% was achieved. The soot deposited was almost uniform in amount at all cross-sections transverse to the long axis of the filter cartridge. The regeneration interval until a back pressure of 0.2 bar was reached was 1.2 hours.

In comparison with this a conventional open pore ceramic foam filter of 60 ppi, in the form of a solid cylinder of same outer dimensions and having axial flow of the exhaust gases, exhibited a soot extraction efficiency of only 72%. The initial back-pressure was 0.16 bar and the regeneration interval i.e. until a back-pressure of 0.2 bar was reached, was only 15 min. The conventional filter cartridge must therefore be regenerated 5 times as often as the filter cartridge according to the invention, and this with a poorer soot extraction efficiency. The filter cartridge was sectioned in slices transverse to the longitudinal axis. This revealed decreasing content of soot in the direction of exhaust gas flow.

EXAMPLE NO. 4

A further ceramic which is suitable for the manufacture of open pore ceramic foam filter cartridges according to the invention contains cordierite. Such a ceramic can contain a cordierite-fireclay as the main constituent. In this context a slurry of 55 wt % cordierite-fireclay, 32 wt % alumina and 13 wt % talcum was found to be advantageous.

A two-layer polyurethane foam in the form of an open cylinder as in FIG. 5, 150 mm long, 140 mm diameter and 40 mm wall thickness, having a 20 mm thick outer layer of 46 ppi and a 20 mm thick inner layer of 64 ppi was immersed in the slicker, and baked at a temperature of 1330° C. for 10 hours. The result was a filter body which was mechanically stable throughout, and featured an outer, open pore ceramic foam layer of 50 ppi and an inner layer of 70 ppi; used in a device for scrubbing the exhaust gases from diesel engines, as shown in FIG. 5, an average back-pressure of 0.11 bar was obtained while in service, and a soot extraction efficiency of 84% achieved. Compared to this an identically dimensioned filter cartridge of open pore ceramic foam of 70 ppi, made up using a single layer of polyurethane foam and the same slurry, achieved a comparable soot extraction efficiency of 86%, while the average back-pressure during service was 0.18 bar.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A filter cartridge comprising a cylinder, a cylindrically shaped opening within said cylinder, the axis of which opening coincides with the axis of said cylinder, and said cylinder being formed of an open pore ceramic foam material having a composition consisting essentially of lithium aluminum silicate, the ceramic foam material being formed from a material consisting essentially of 68-95 wt % petalite, 1-5 wt % bentonite, 1-5 wt % kaolin and up to 30 wt % alumina.

2. A filter cartridge according to claim 1 wherein said ceramic foam material has a porosity of 40-80 ppi.

3. A filter cartridge according to claim 1 wherein said ceramic foam material has a substantially uniform porosity throughout its entire volume.

4. A filter cartridge according to claim 1 wherein said ceramic foam material has a substantially uniform composition throughout.

5. A filter cartridge comprising a cylinder, a cylindrically shaped opening within said cylinder, the axis of which opening coincides with the axis of said cylinder, and said cylinder being formed of an open pore ceramic foam material having a composition consisting essentially of lithium aluminum silicate, the ceramic foam material being formed from a material consisting essentially of 79 wt % petalite, 3 wt % bentonite, 3 wt % kaolin and 15 wt % alumina.

6. A filter cartridge comprising a hollow cylinder having sidewalls, said sidewalls being formed of an open pore ceramic foam material having a porosity of 40-80 ppi, a cylindrically shaped opening within the cylinder having an axis which coincides with the axis of said cylinder for permitting exhaust gases to be fed radially through said sidewalls and thereby obtaining filtration over substantially the whole length of the cartridge and a reduction in back pressure and a base formed from said open pore ceramic foam material which closes said cylindrically shaped opening at one end.

7. A filter cartridge according to claim 6 wherein said base is treated to be impermeable to gases.

* * * * *